INVENTOR
Richard R. Butts,
BY Fearman & Fearman
ATTORNEYS

Oct. 21, 1958 R. R. BUTTS 2,856,735
GRINDING MACHINES

Filed Oct. 28, 1954 3 Sheets-Sheet 2

INVENTOR
Richard R. Butts.
BY Fearman & Fearman.
ATTORNEYS

INVENTOR
Richard R. Butts.
BY Fearman & Fearman.
ATTORNEYS

United States Patent Office 2,856,735
Patented Oct. 21, 1958

2,856,735

GRINDING MACHINES

Richard R. Butts, Saginaw, Mich., assignor of one-third to George R. Harris, Bay City, one-third to Daniel J. Menter and one-third to James Menter, Jr., Saginaw, Mich.

Application October 28, 1954, Serial No. 465,165

8 Claims. (Cl. 51—56)

The present invention relates to machine tools, and more particularly a grinding machine for grinding workpieces such as precision tools including tool bits, reamer blades, and various other cutting tools requiring a fine cutting edge.

One object is to provide a grinding machine or the like in which the grinding wheel head is reciprocated in such a manner as to eliminate abrasive grooves in the workpiece which is accomplished by reciprocating the tool head to and fro while the workpiece is presented thereto and to the grinding surface of the grinding wheel.

Another object is to provide a machine tool such as a grinding machine with a reciprocating grinding wheel support which is adapted to be adjusted to increase or decrease the length of the reciprocating motion and regulate the to and fro movement thereof.

Another object is to provide a machine tool in which the grinding wheel supporting head is reciprocated in such a manner that the abrupt reversal of the grinding wheel head is eliminated.

Another object is to provide a machine tool such as a grinding machine in which the length of the stroke may be controlled while the grinding wheel is in operation, and its to and fro travel along a pathway may be increased or decreased during the finishing operation of various workpieces requiring a highly polished surface.

Another object is to provide a machine tool in which the grinding wheel is reciprocated radially with respect to its axis in a horizontal plane so that a workpiece presented to its grinding wheel surface will be finished and ground to produce the desired surface without the attendant abrasion scratches which are apparent in workpieces in which the grinding wheel and workpiece are relatively immovable.

Other objects and advantages of the invention will become apparent during the course of the following description of the accompanying drawings wherein.

Figure 1:
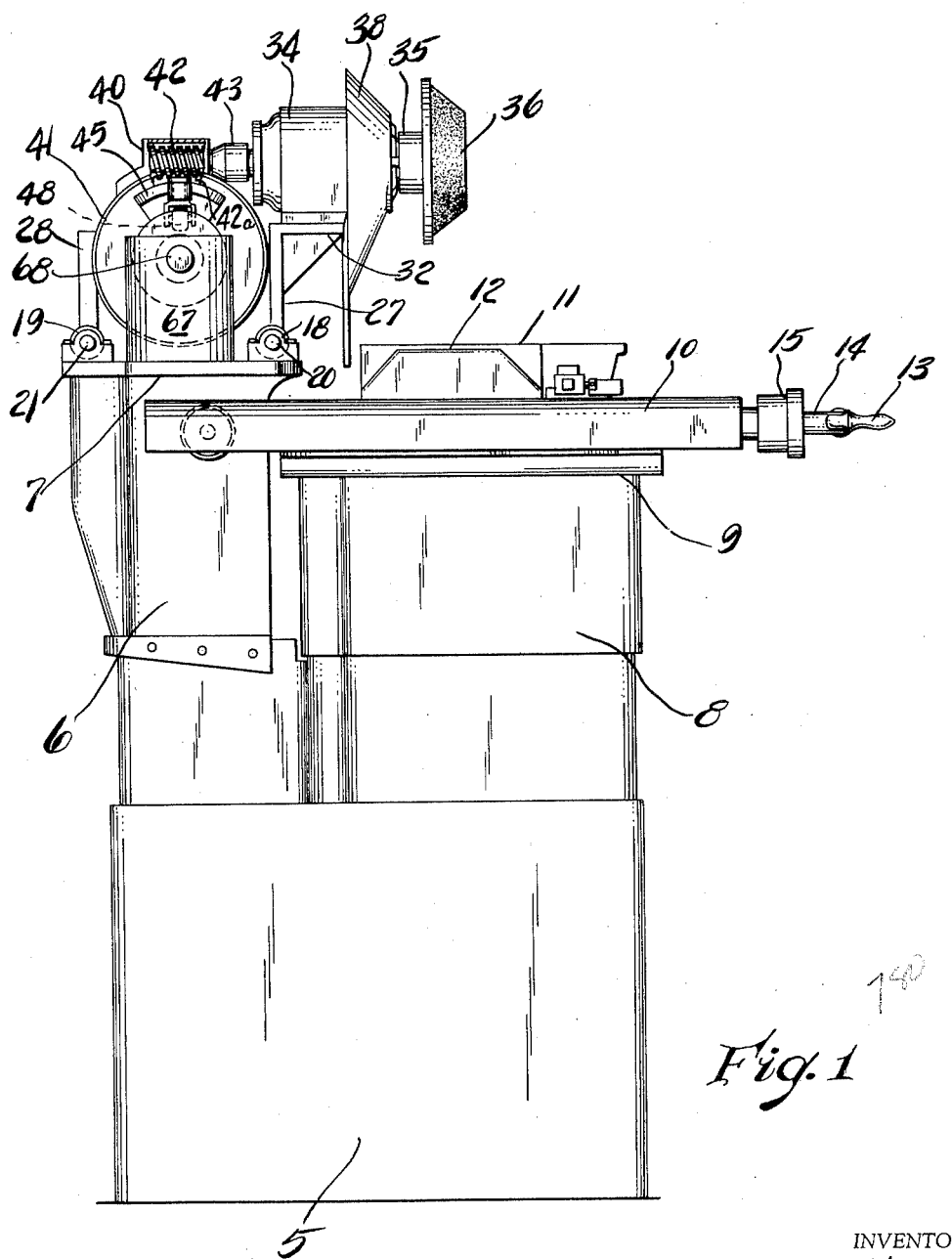
Figure 1 is a side elevational view of a machine tool or grinding machine embodying the invention, and showing the manner in which the grinding wheel is mounted on a slide for reciprocating movement.
Figure 2:
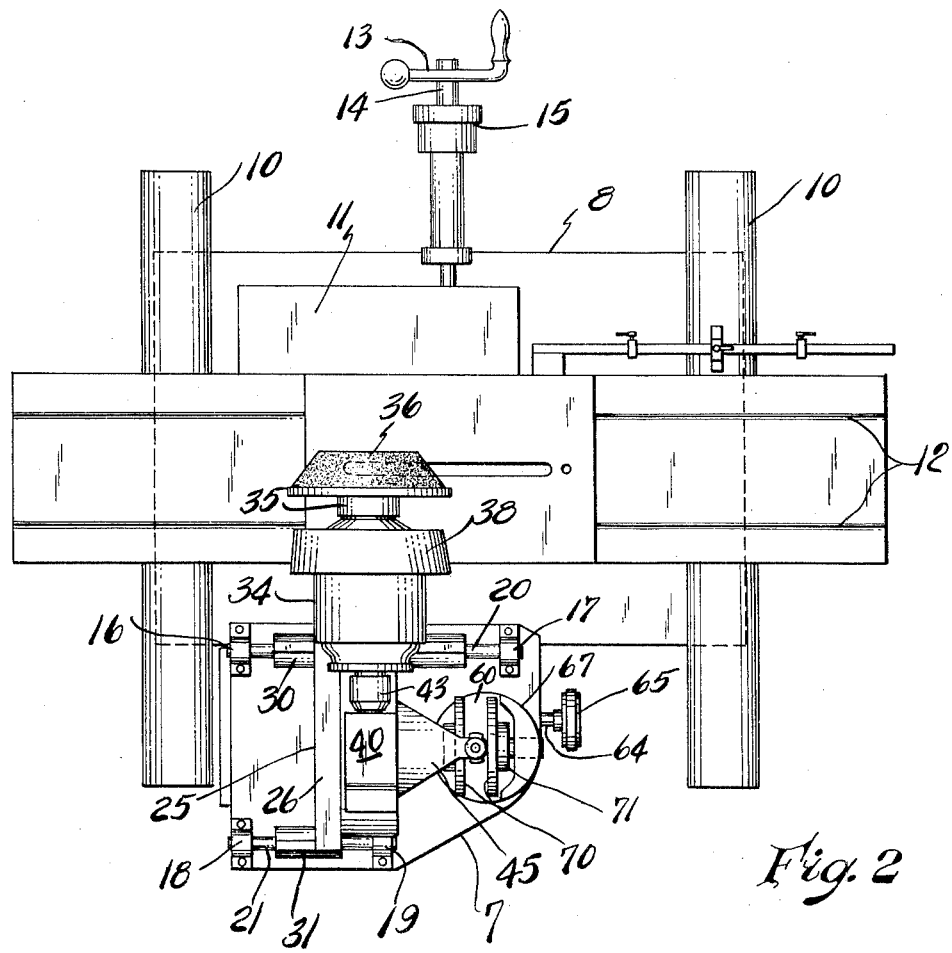
Figure 2 is a top plan view of the grinding machine showing the control templet or guide in a neutral position with the guide plates arranged parallel to the plane of the axis of the grinding wheel.

In the drawings, and wherein for the purpose of illustrating the invention, the reference character 5 will generally be employed to designate a base having an upright 6 at the rear thereof formed of a casting provided with a flat upper portion 7. Forwardly of the upright 6 is a table support 8 which may also comprise a casting having a flat table-like portion 9 on which is mounted a cross slide 10 for supporting a work table 11. The work table 11 is also mounted on ways 12 and the cross slide 10 is actuated by means of a threaded shaft having a control handle 13. The handle 13 is attached to the shaft 14 and an indicator 15 is graduated in units of linear measure to permit the cross-slide 10 to be actuated various predetermined distances.

The flat surface 7 on the upper end of the casting 6 is provided with spaced sets of supports 16 and 17 at the front thereof and 18 and 19 at the rear portion thereof. It being noted that the bearing blocks 18 and 19 are spaced closer together than the bearing blocks 16 and 17. Supported between the bearing blocks 16 and 17 is a guide rod 20, and similarly mounted between the bearing blocks 18 and 19 is a guide rod 21 which extends parallel with the guide rod 20 and in spaced relation relative thereto. A grinding wheel frame or support generally designated 25 is adapted to be supported on the guide rods 20 and 21, and said grinding wheel frame 25 includes a casting comprising a horizontal portion 26 having depending leg portions 27 and 28 at the front and rear thereof. The lower extremities of the depending portions 27 and 28 are provided with tubular slide guides 30 and 31 which are mounted on the slide rods 20 and 21 for reciprocating to and fro movement. The grinding wheel support is formed with an extension 32 on the forward portion of the depending member 27 which is adapted to support an electric motor 34, the armature shaft of which has secured thereto the hub 35 of a grinding wheel 36. A guard or shield 38 is supported on the motor housing 34 to prevent abrasive dust from gaining access to the slide guide bearings and the armature shaft bearings.

The opposite end of the armature shaft of the electric motor 34 extends into a worm housing 40 which is mounted on top of a gear wheel housing 41. The gear wheel housing 41 is suitably secured to the grinding wheel support 25 and to the casting 26, and mounted within the worm housing 40 is a worm 42 which is connected to the armature shaft of the motor 34 by means of a coupling 43. Rotatably mounted within the gear housing 41 is a gear wheel 42a which is drivingly engaged by the worm 42 to rotate said wheel at a reduced speed. Secured to one of the radial walls of the gear wheel to rotate therewith is an arm 45 which is mounted and secured adjacent the peripheral edge of the gear wheel in such a manner as to describe a circular arc when the gear wheel is rotated. The free end of the arm 45 is provided with an extension 46, the end of which is bifurcated for receiving a roller 48 which may be in the form of a spherical member pivoted between the bifurcated arms of the lateral extension 46.

Figure 4:
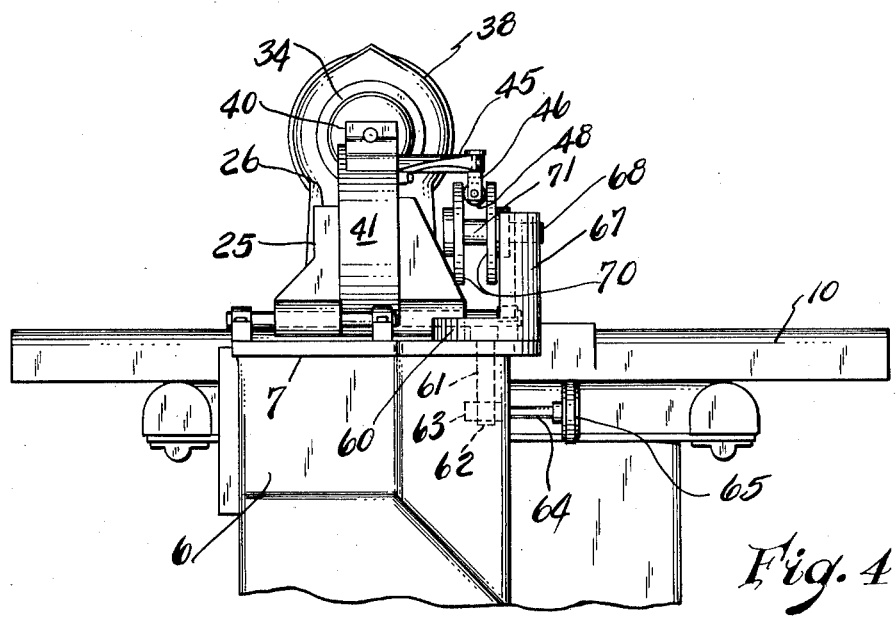
Figure 4 is a rear elevational view of the grinding machine showing a portion of the base broken away and illustrating the manner in which the guide disks are mounted for adjustment to enable the grinding wheel support to be reciprocated to and fro.

Rotatably mounted on the flat portion 7 of the casting 6 is a rotatable support 60 which has a shaft extension on its underside (not shown in full lines), but indicated at 61 in dotted lines in Figure 4. The shaft extension 61 is mounted in a suitable bearing opening in the flat portion 7 of the casting 6, and the lower end thereof is provided with a worm wheel 62 adapted to be engaged by a worm 63 secured to one end of a control shaft 64. The control shaft 64 is mounted in a suitable bearing opening and the outer end is provided with a control knob 65 having a knurled peripheral surface to facilitate easy gripping when making adjustments.

The rotary support 60 is provided with an upstanding portion 67 having a transverse shaft 68 adjacent its upper end for supporting a pair of spaced disks 70. The disks 70 have their hubs 71 secured to the shaft 68 by suitable fasteners, and it is to be noted that the spherical member 48 is mounted between the disks 70 in such a manner as to describe a circular arc around a path adjacent the peripheral edges of the disks 70.

Figure 3:
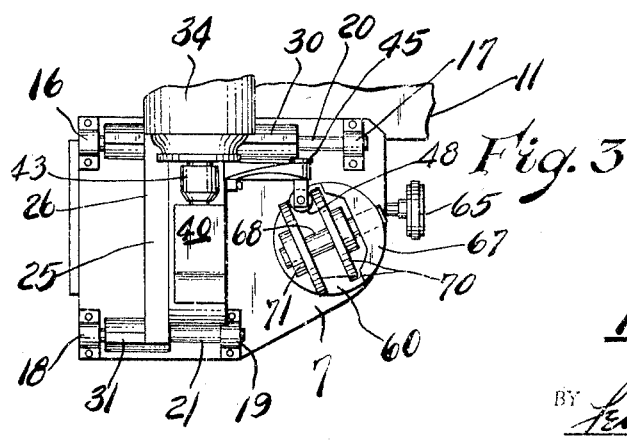
Figure 3 is a fragmentary top plan view similar to Figure 2, but showing the guide disks displaced an angular distance of approximately 30 degrees to permit the grinding wheel support to be reciprocated a distance equal to the angular displacement of the guide disks.
Figure 5:
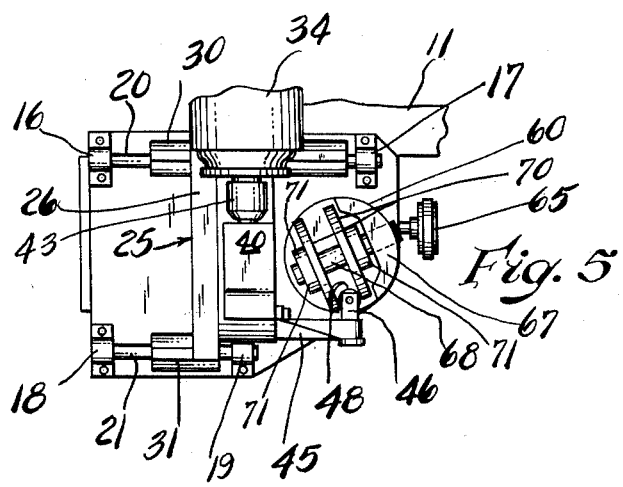
Figure 5 is a fragmentary top plan view similar to Figure 3, but showing the grinding wheel support at the opposite end of its stroke.

By adjusting the control or adjusting knob 65 so as to position the disks 70 angularly with respect to the axis of the grinding wheel (see Figures 3 and 5) the grinding wheel casting 25 or support and grinding wheel are reciprocated to and fro on the slide rods 20 and 21.

It will thus be seen, that by triangulation, the templet disks 70 may be angularly adjusted so that the grinding wheel will move in a direction radially of its axis along a horizontal path a predetermined distance. Thus, precision tools and the like can be ground with a comparatively smooth surface substantially free from abrasive marks. A suitable supporting fixture can be secured to the table 11 by conventional hold-down bolts in the slots in said table, and said fixture may hold a workpiece such as a drill or reamer so that the end thereof is presented to the radial wall of the grinding wheel 36.

In operation, the electric motor 34 is connected to a suitable source of electrical energy such that the grinding wheel 36 will be rotated at a predetermined cutting speed. The worm 42 on the opposite end of the armature shaft will be driven at the same speed and will rotate the arm 45 at a reduced speed such that the arm will travel through a circular arc and the spherical element 48 will be guided between the disks 70. When the disks 70 are displaced an angular distance of approximately 30 degrees with respect to the grinding wheel axis, the grinding wheel supporting casting 26 will be reciprocated along the slide rods 20 and 21 a predetermined distance in a path transverse to the axis of rotation of the tool holding shaft 35. It will be noted, that in one direction of reciprocating movement of the grinding wheel 36 and its supporting parts, one of the disks 70 is exerting a thrust while when the motion is reversed, the thrust is transferred to the other or opposite disk 70. This shifting of the thrust force causes a relatively slow change of direction of the grinding wheel at the ends of its stroke rather than an abrupt reversal. It will be seen further, that through substantially one-half of a single revolution the arm 45 travels from the top to the bottom of its orbit remote from the grinding wheel, while its remaining movement through the 180 degree arc or remaining travel is adjacent the grinding wheel.

By adjusting the angular position of the disks 70 with respect to the axis of the grinding wheel, the grinding wheel support slide 25 can be reciprocated various linear distances. Thus, it will be seen that when relatively small workpieces are being operated upon, the slide may be moved a short distance, while when grinding workpieces of larger dimensions the grinding wheel slide 25 may be moved to and fro the full limit of length of the slide rods 20 and 21.

It is to be understood that the form of the invention herewith shown and described is to be taken as a preferred embodiment thereof, and that various changes in the shape, size and arrangement of parts may be resorted to without departing from the spirit of the invention or the scope of the subjoined claims.

What I claim is:

1. In a machine tool, a base, a slideway on said base, a carriage reciprocably mounted on said slideway, a rotary shaft mounted on said carriage, a rotary tool on one end of said shaft, gearing associated with said shaft, an adjustable guide on said base including a pair of spaced disks adapted to be arranged at an angle with respect to the axis of said shaft, and an arm rotatably mounted on said carriage arranged to be driven by said gearing so that its free end may engage between said guide disks and cause said carriage to be reciprocated transversely to the axis of said shaft when said disks are arranged in angular relation with respect to the shaft axis.

2. In a machine tool, support means, a tool carriage, a tool on said carriage, means for revolving said tool about an axis of rotation, a tool carriage support surface on said support means arranged laterally relative to said axis of rotation of the tool and on which said carriage is reciprocable, rotary means on said carriage, control means mounted on the support means associated with said rotary means and causing the movement of said rotary means to create reciprocation of said carriage, and means operable to vary the position of the control means while the carriage is reciprocating to vary the stroke thereof.

3. In a machine tool, support means, a tool carriage, a rotary tool on said carriage, motor means for revolving said tool about an axis of rotation, carriage supports extending laterally on said support means relative to said axis of rotation and on which said carriage is movable through a stroke, a guide remote from said carriage comprising a pair of spaced apart disks mounted on said support means for angular adjustment relative to the axis of rotation of said tool, means for adjusting said pair of disks, a guide engaging arm extending laterally from said carriage to substantially the peripheral edge of said disks, and a follower on said arm supported therefrom and projecting in between said disks, one of said pair of disks and guide engaging arm being revolvable relative to the other so that said disks cause said arm and thereby said carriage to be reciprocated, the stroke of reciprocation of said carriage being variable by operation of said adjusting means.

4. In a machine tool, support means, a tool carriage, a motor on said carriage, a tool on said carriage driven by said motor about an axis of rotation, a slideway on said support means arranged transversely to the said axis of rotation, a drive wheel on said carriage with its axis substantially parallel to said slideway, an arm off center on said wheel extending from said carriage substantially parallel to the said slideway, means for driving said drive wheel from the motor, a guide unit comprising a pair of spaced apart upright disks, transverse to the slideway, an upright revolvable shaft on which said disk unit is mounted journaled in said support means, an adjusting wheel in operative engagement with said revolvable shaft operable to pivot said shaft and move said guide unit so that it is operatively disposed at a variable angle relative to the axis of rotation of said tool, said arm extending to the peripheral edge of said disks and having a follower roller projecting therefrom between said disks moved laterally by one disk through half of a revolution of said arm and moved laterally in the reverse direction by the other disk through the other half of said revolution to thereby reciprocate said carriage through a variable stroke while the tool is rotating.

5. In a machine tool, a base having a slideway thereon; a rotatable tool holder; a supporting member for said tool holder mounted on said base for reciprocating movement on said slideway, the arrangement being such that the path of reciprocating movement of said member is transverse to the axis of rotation of said tool holder; driving means connected to said tool holder for rotating the latter; normally stationary control means carried by said base and so arranged as to present a guide surface extending obliquely to said axis of rotation and to said path of reciprocating movement; and means driven by said driving means and reacting against said guide surface to effect reciprocating movement of said member.

6. The construction set forth in claim 5 including means to said control means for varying the position thereof so as to vary the magnitude of reciprocating movement of said member.

7. In a machine tool, a support; a tool supporting member movable to and fro on said support; rotatable driving means for rotating a tool supported by said supporting member; adjustable guide means; one of said means being mounted for movement with said member and the other of said means being mounted on said support; means reacting between said driving means and said guide means for effecting to and fro movements of said member on said support in a direction transverse to the axis of rotation of said driving means; adjusting means normally stationary relative to said guide means and accessible during to and fro movements of said member; and means interconnecting said adjusting means and said guide means for adjusting the position of said guide means and varying the extent of to and fro movements of said member.

8. The construction set forth in claim 7 in which the driving means is mounted on said member and the guide means is mounted on said support.

References Cited in the file of this patent

UNITED STATES PATENTS

| | | |
|---|---|---|
| 888,675 | Ward et al. | May 26, 1908 |
| 909,300 | Hirth | Jan. 12, 1909 |
| 1,581,919 | Case | Apr. 20, 1926 |
| 1,659,560 | Bausch | Feb. 21, 1928 |
| 2,023,347 | Van Valkenburgh | Dec. 3, 1935 |
| 2,318,799 | Price et al. | May 11, 1943 |

FOREIGN PATENTS

| | | |
|---|---|---|
| 499,265 | Germany | June 4, 1930 |
| 341,954 | Great Britain | Jan. 26, 1931 |